United States Patent
Herring et al.

(12) 
(10) Patent No.: US 6,373,796 B1
(45) Date of Patent: Apr. 16, 2002

(54) DISC CHANGER

(75) Inventors: Lloyd D. Herring, Rockford, MI (US); Peter Chaikowsky, Bel Air, MD (US)

(73) Assignee: Rowe International, Inc., Grand Rapids, MI (US)

( * ) Notice: Subject to any disclaimer, the term of this patent is extended or adjusted under 35 U.S.C. 154(b) by 0 days.

(21) Appl. No.: 09/428,980

(22) Filed: Oct. 28, 1999

Related U.S. Application Data (60) Provisional application No. 60/107,793, filed on Nov. 10, 1998.

(51) Int. Cl.$^7$ ................................................ G11B 17/22
(52) U.S. Cl. ..................................................... 369/36.01
(58) Field of Search ............................... 369/36, 37, 30, 369/24, 178, 191, 204; 360/97.03, 98.01, 98.04

(56) References Cited

U.S. PATENT DOCUMENTS

| | | | |
|---|---|---|---|
| 2,946,594 A | 7/1960 | Staar | 369/39 |
| 3,165,321 A | 1/1965 | Osborne et al. | 369/37 |
| 5,031,164 A | 7/1991 | Rockola et al. | 369/37 |
| 5,067,116 A | 11/1991 | Kadrmas | 369/37 |
| 5,187,695 A | 2/1993 | Schindler et al. | 369/37 |
| 5,235,579 A | 8/1993 | Ross | 369/37 |
| 5,282,183 A | 1/1994 | Arifuku et al. | 369/36 |
| 5,307,331 A * | 4/1994 | d'Arc | 369/37 |
| 5,353,179 A * | 10/1994 | Elliott et al. | 360/92 |
| 5,431,520 A * | 7/1995 | Brugger | 414/277 |
| D369,809 S | 5/1996 | Pines et al. | D14/260.1 |
| 5,586,094 A | 12/1996 | Pines et al. | 369/36 |
| 5,729,524 A * | 3/1998 | Pines et al. | 369/178 |
| 5,886,975 A | 3/1999 | Pines et al. | 369/178 |

FOREIGN PATENT DOCUMENTS

JP 244388 11/1990

OTHER PUBLICATIONS

PCT International Publication No. WO 95/29485, published Nov. 2, 1995.

* cited by examiner

Primary Examiner—A. J. Heinz
Assistant Examiner—Julie Anne Watko
(74) Attorney, Agent, or Firm—Van Dyke, Gardner, Linn & Burkhart, LLP (57) ABSTRACT

A disc player and changer mechanism adapted for use in a jukebox comprises a disc carrier which has a clamping arm movably mounted thereto, a translating tower and a drive system operable to move the carrier and/or the translating tower. The clamping arm includes a first disc engaging portion at one end thereof, which is positioned substantially opposite to a second disc engaging portion of the disc carrier. The disc carrier is slidably mounted on the translating tower and the clamping arm is movable as the disc carrier is moved on the translating tower such that the first disc engaging portion moves to contact an edge of a disc while the second disc engaging portion correspondingly contacts the edge of the disc substantially diametrically opposite of the first disc engaging portion. The disc is thus positively secured between the first and second disc engaging portions and may be transported from its initial position to a disc playing mechanism in a conventional manner. Preferably, the translating tower includes a magnetic hub assembly which is mechanically operable to engage a magnetic hub with the disc as the disc is positioned substantially adjacent to the player mechanism. The magnetic hub assembly is pivotally attached to the translating tower and operable by a stationary extension contacting a portion of the magnetic hub assembly as the translating tower approaches the disc player mechanism.

58 Claims, 8 Drawing Sheets

DISC CHANGER

This non-provisional application claims priority from U.S. Provisional Patent Application, Ser. No. 60/107,793, filed Nov. 10, 1998, which is hereby incorporated herein by reference.

BACKGROUND OF THE INVENTION

This invention relates generally to compact disc changers for jukeboxes. While the invention is especially adapted to changer mechanisms which may be used in wall mounted jukeboxes, it has application in all types of jukebox configurations.

Known compact disc (CD) changing systems in jukeboxes and the like include an articulating arm which grasps a CD to move it to the CD player. While such a design is effective in moving the CD from a storage rack to a CD player, it is a complicated device which requires several intricate and movable parts. Not only does this increase the cost of the system, but, due to the number of moving parts and the complexity of these articulating mechanisms, frequent adjustments may be required for the arms to consistently grasp the CDs in an appropriate manner, further increasing the service costs and downtime. Proper adjustment is critical with an articulating arm CD changer, since the arms typically grasp the selected CD by its opposite faces, squeezing the CD as it is moved to the play position. Even a minimal misalignment in the CD changer thus may lead to damage of the discs in the jukebox.

Another concern with the articulating arm changers is that they require a substantial amount of space in addition to the space required by the CD rack itself, since the arm must lift the CD from the rack and pivot to the appropriate position on the CD player. The space requirements may be further increased by the CD racks of such a changer mechanism, as special rotating or otherwise moveable racks may be required to position the selected CD in a location where the arm may properly grasp onto the surfaces of the disc. Not only do these racks substantially increase the space required by the changer mechanism, but they also may result in greater difficulty in replacing CDs when they are damaged or as new selections are provided, since each disc may have to be individually placed into its location in the rack.

With the growing market for wall-mounted jukeboxes, it is desirable that the overall size of the CD changing mechanisms fit within a reduced compartment. Wall-mounted jukeboxes typically occupy a smaller space than a standard, freestanding jukebox, since the wall-mounted versions are generally designed to minimize the distance that they extend outward from the wall. This is preferred not only to provide a compact jukebox that is less likely to interfere with floor space in the bar, restaurant or the like where it may be located, but also to minimize the cantilever loading effects on the fasteners that secure the jukebox to the wall.

It is also desirable for a CD changer mechanism to provide for easy and quick serviceability in order to minimize the down time of the units and further to minimize the costs of repairs. In typical articulating arm changers or rapid moving electronic changers, the costs and time lapse associated with repairing the units in the event of a breakdown are relatively high, due to the complicated circuitry and intricate moving parts associated with these units. These units may be difficult or impossible to repair with the standard tools available to technicians called to repair the unit at the bar or restaurant in which it is located. This often results in these units or components thereof being sent back to the manufacturer for repair, which greatly adds to the cost of the repairs and to the time lapse before the jukebox is again operational.

Furthermore, it is generally desirable to have a CD changer mechanism that minimizes the elapsed time between the end of one song and the start of the next song. In an articulating arm changer, additional time is typically required for the arm to align with the CD and firmly grasp the CD without damaging its surface, and then to lift the CD from the rack and pivot it into the appropriate location on the CD player. All of these movements require a certain amount of time in order to prevent damaging either the discs or the changer assembly itself. Other changer mechanisms are commercially available that rapidly change to the next disc, but these are complicated units with multiple moving parts, resulting in higher cost and greater difficulties in servicing the units.

In order to minimize contact with surfaces of the CD and to further minimize the space required for the CD changer, designs have been proposed which include a horizontally extending rack of CDs and a disc transporter which lifts the CDs upward from the rack and moves them horizontally toward the CD player. An example of such a CD changer is disclosed in U.S. Pat. No. 5,586,094, issued to Pines et al., which discloses a CD changer having a CD carrier which lifts upwardly on the lower edges of a particular CD and then transports the disc to the CD player. The CD is lifted by a transfer arm that has a pair of inward projections at its lower ends, which contact the lower edges of the disc as the transfer arm is lifted upwards. The disc rests against the projections due to gravitational forces, which act to seat the disc against the projections as they are lifted upwardly and transported between the CD rack and the CD player, such that the disc is not positively secured to the carrier or transfer arm.

After the disc is transported to the CD player, the disc is rotably secured to the player by a holder, such as a magnetic hub or the like. A typical magnetic hub may be moved by a separate electronic motor which pivots, slides or otherwise moves the holder into an engagement position adjacent to the disc and player. The disc is then rotatably secured between the holder and CD player for playing the disc. Such disc holders further add to the electronic and/or intricate components of the jukebox, which adds to the costs of manufacturing the jukeboxes and the time lapse and costs associated with repairing and maintaining the jukeboxes.

Therefore, there is a need in the art for a disc changer which is inexpensive and relatively easy to service due to a minimal number of complex and moving parts. Furthermore, the disc changer is preferably compact in order to be positioned within the narrow space constraints of a wall-hung jukebox.

SUMMARY OF THE INVENTION

The present invention is intended to provide a compact optical disc or CD changing mechanism operable with a disc rack or magazine which is compact and may be easily changed to provide the jukebox with new selections, and which positively secures a disc to a carrier and transports the disc from its position within a rack of discs to the player.

According to an aspect of the present invention, a jukebox comprises a disc player, a disc carrier, a translating tower and a drive system for moving the disc carrier and translating tower. The disc carrier exchanges a disc between a rack of discs and the disc player and is mounted to move along the translating tower. The disc carrier includes at least two grabbing members, at least one of which is movable in response to a movement of the disc carrier along the translating tower. The movable grabbing member is movable between a disc engaging position where it engages an edge of the disc and a disc releasing position.

In one form, a first grabbing member is movably mounted to the disc carrier and a second grabbing member is fixedly interconnected to the disc carrier. Preferably, the first and second grabbing members positively secure the disc therebetween substantially diametrically opposite one another.

According to another aspect of the present invention, a jukebox for playing a disc comprises a disc player, a disc carrier for at least occasionally engaging carrying a disc to the disc player, a translating member interconnected to the disc carrier, a disc holder for rotatably securing the disc to the disc player, a trigger member for engaging a portion of the disc holder and a drive system. The translating member is movable to translate the disc in the disc carrier to the disc player. The disc holder is movably mounted to the translating member. The trigger member is engageable with the disc holder in response to a movement of the translating member toward the disc player such that the disc holder correspondingly moves to secure the disc to the disc player.

In one form, the disc carrier includes a first disc engaging portion and a second disc engaging portion, where the first disc engaging portion is on an end of a clamping arm pivotally mounted to the disc carrier. Preferably, the clamping arm is pivotable in response to a movement of the disc carrier along the translating tower so that the first disc engaging portion moves to engage a first portion of an edge of the disc while the second engaging portion correspondingly engages a second portion of the edge of the disc, thereby positively securing the disc between the first and second disc engaging portions.

DESCRIPTION OF THE PREFERRED EMBODIMENTS

Figure 1:
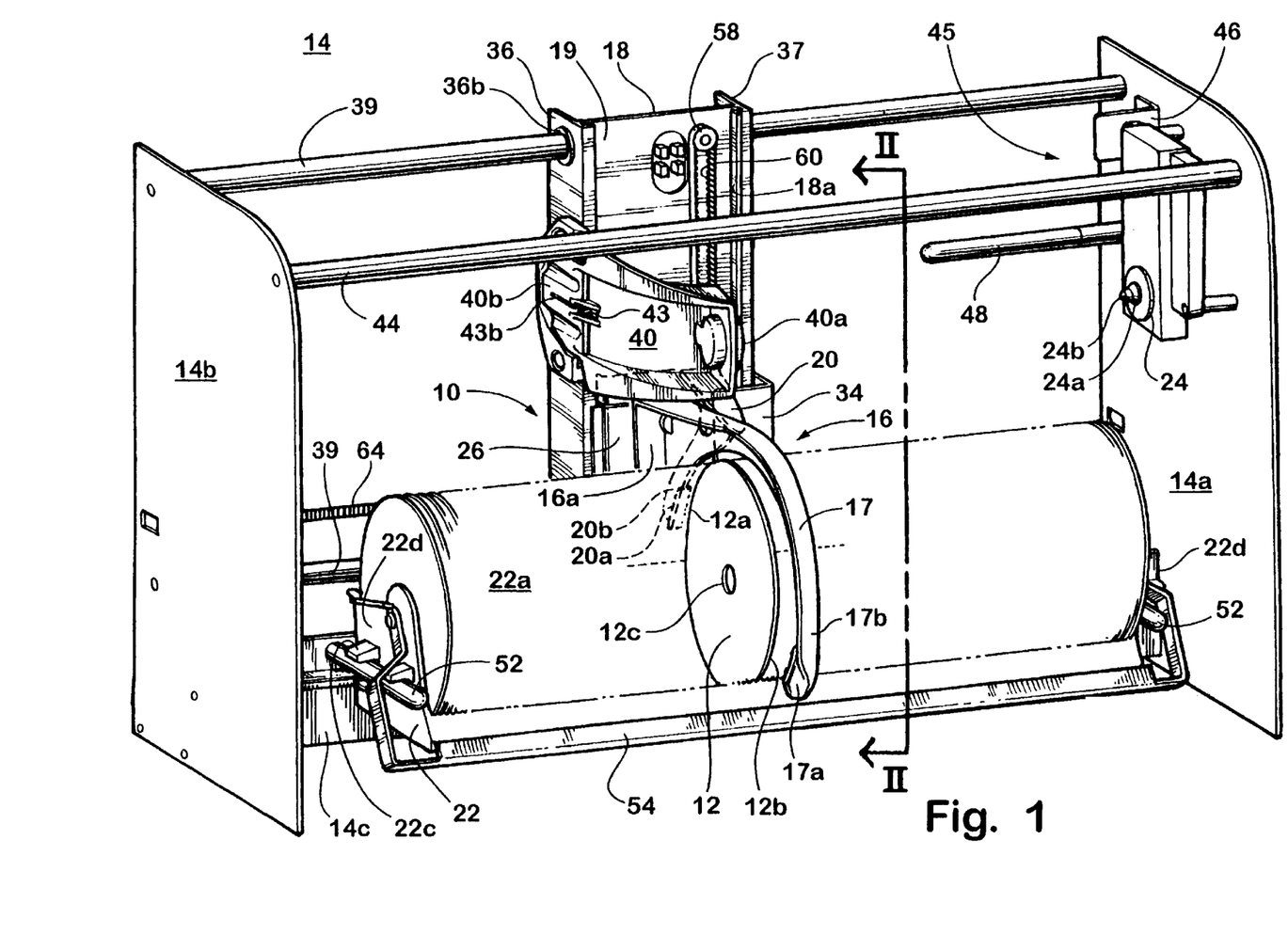
FIG. 1 is a perspective view of a jukebox incorporating the disc changer of the present invention.
Figure 2:
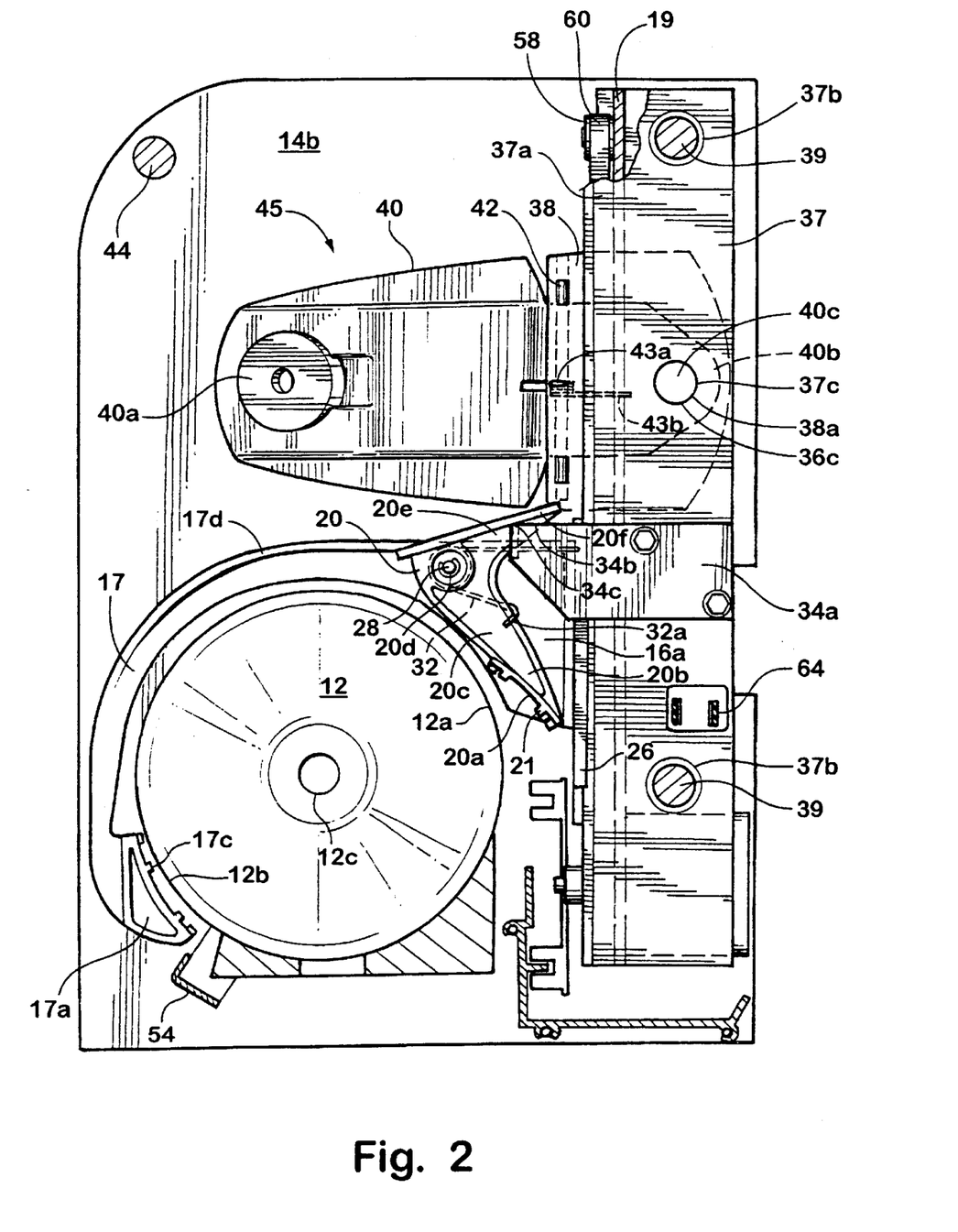
FIG. 2 is a sectional view of the disc changer taken along the line II—II in FIG. 1.
Figure 3:
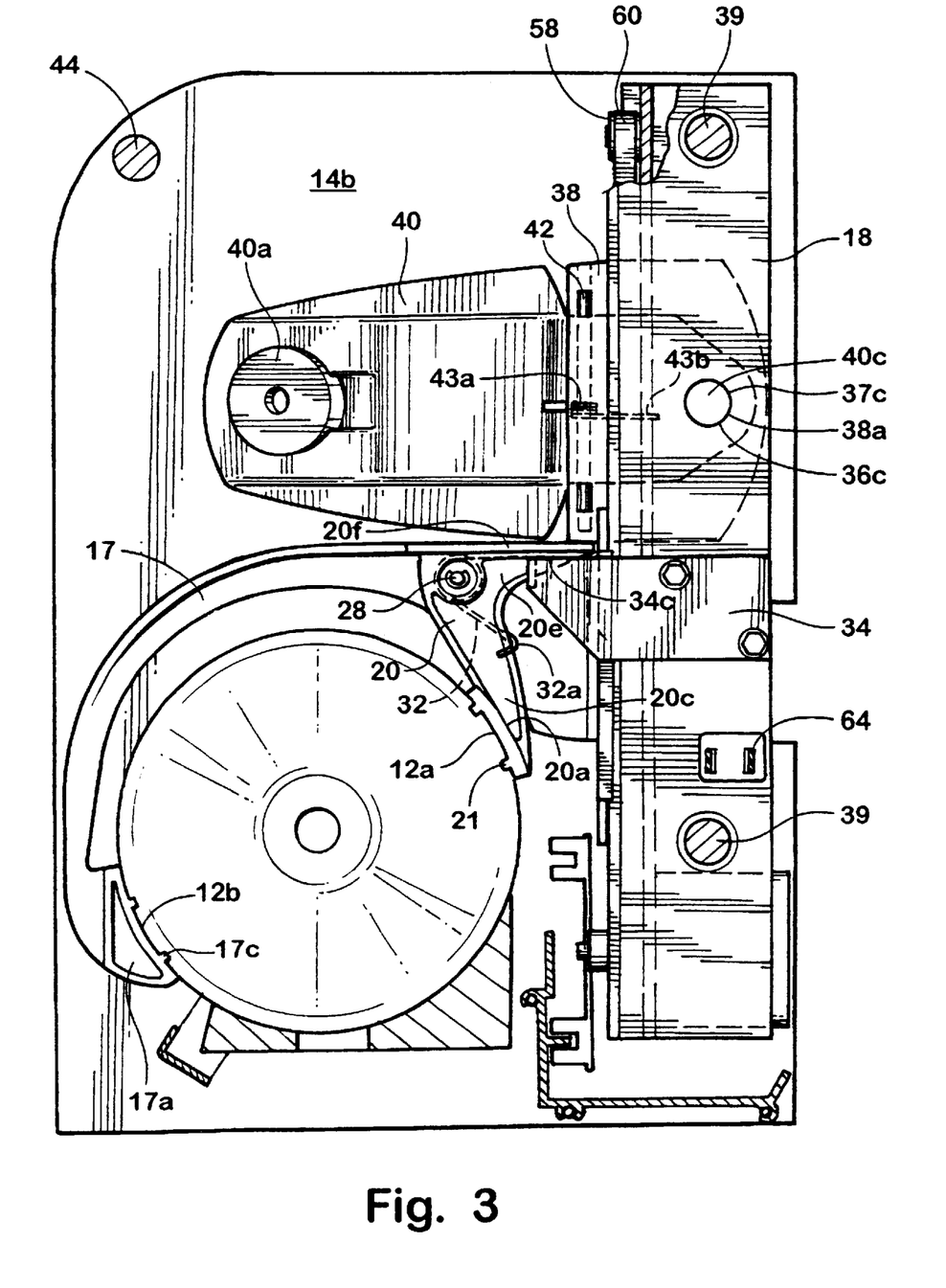
FIG. 3 is the same view as FIG. 2, illustrating the disc changer lifted upward in a disc gripping state.
Figure 4:
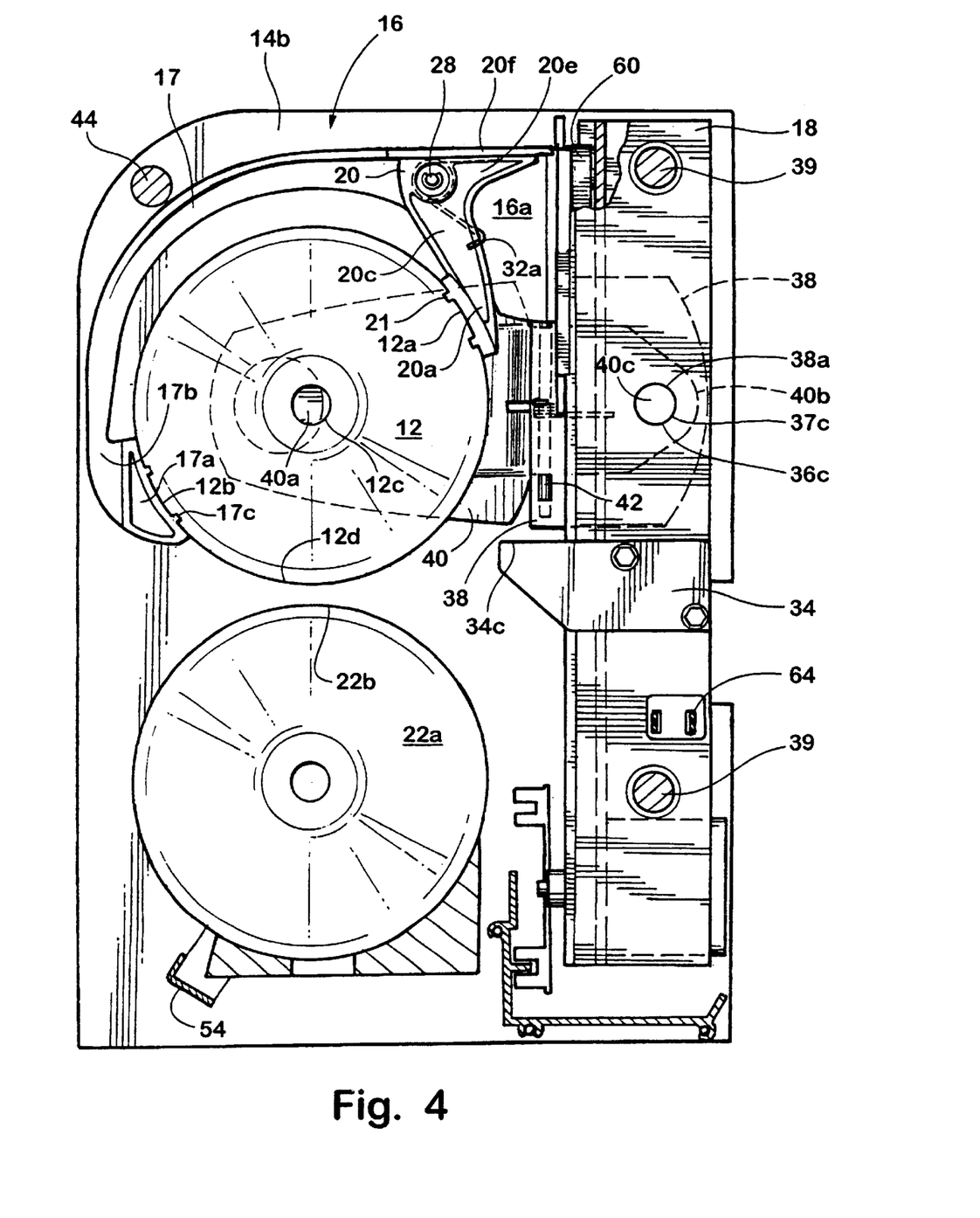
FIG. 4 is a the same view as FIGS. 2 and 3, illustrating the disc changer lifted upward to a translation mode for transportation of the disc to or from the disc player.

Referring now to the drawings and the illustrative embodiments depicted therein, there is shown in FIG. 1 a disc changer 10 which may be adapted for use in a jukebox 14, and preferably adapted for use in a wall-mounted jukebox. Disc changer 10 includes a disc carrier 16, which comprises a lifting arm or bow 17 and a base portion 16a, which is slidably mounted to a translating tower 18. Disc carrier 16 is preferably vertically movable along translating tower 18. Lifting bow 17 extends from base portion 16a of disc carrier 16 and includes a lower disc engaging or contacting portion or member 17a, which is positioned at a distal end 17b of lifting bow 17 from base portion 16a. A clamping arm 20 is pivotally attached to base portion 16a of disc carrier 16, and includes an upper disc engaging or contacting portion or member 20a (FIGS. 2, 3 and 4), which is preferably positioned along a lower end 20b of clamping arm 20. As disc carrier 16 is moved from a first transportation mode, which is capable of translating along the row of discs, upwardly relative to a plurality of discs 22a in a storage rack or magazine 22 to a disc grasping mode, clamping arm 20 disengages from an arm engaging bracket or opening member 34. This allows clamping arm 20 to move, such as by pivoting, until upper disc contacting surface 20a contacts and engages an upper portion 12a of a circumferential edge of a disc 12. While clamping arm 20 moves to engage contacting surface 20a with disc 12, lower disc engaging member 17a is correspondingly raised to contact and engage a lower portion 12b of the edge of disc 12, thereby positively securing disc 12 between the disc engaging or disc grabbing members 17a and 20a, as shown in FIGS. 2, 3 and 4. Disc carrier 16 may then be moved further upwardly until the disc 12 is substantially above an upper portion of the remaining discs 22a in the magazine 22 to a second transportation mode capable of moving a disc along the row of discs. Disc 12 may then be transported substantially horizontally along the magazine 22 toward and away from a disc player 24 at or near an end of magazine 22. Discs 22a may be optical discs such as compact discs (CDs) or any other disc which may have a readable media.

As shown in FIG. 1, jukebox 14 further has sidewalls 14a and 14b at opposite ends thereof which are connected by a pair of guide rods 39. Guide rods 39 extend across jukebox 14, through translating tower 18, and connect at either end to sidewalls 14a and 14b of jukebox 14. Guide rods 39 guide translating tower 18 back and forth along disc magazine 22, as a disc is selected and translated to and from the disc player 24, which is preferably secured to sidewall 14a. Additional support rods or other supporting members 44 may also extend across jukebox 14 and connect at sidewalls 14a and 14b to support sidewalls 14a and 14b and prevent flexing thereof.

Jukebox 14 further includes a disc exchanger, generally shown at 45, which exchanges a disc between arm 20 and disc player 24. Disc exchanger 45 is operable by movement of translating tower 18 to place a disc on disc player 24 or to remove a disc from disc player 24. Disc exchanger 45 preferably includes a release member 46 and a trigger 48 interconnected with a sidewall 14a of jukebox 14, and a disc holder 40 mounted on translating tower 18 for rotatably securing the disc 12 to the disc player 24 for playing or reading the disc. Release member 46 is preferably positioned at an upper end of sidewall 14a and extends substantially horizontally inwardly, or toward magazine 22, therefrom. Release member 46 engages clamping arm 20 to release disc 12 from disc carrier 16 when the disc is positioned at the disc player 24. Additionally, trigger member 48, which may be a substantially long and preferably cylindrical post or rod 48, may extend inwardly from sidewall 14a, such that trigger 48 may pivot or move a disc holder 40 into engagement with disc 12 in order to rotatably secure disc 12 to disc player 24, as discussed in detail below.

Translating tower 18 may be a substantially vertically oriented tower formed by a pair of side walls 36 and 37 interconnected by a forward face or wall 19. As shown in FIGS. 2, 3, and 4, each of the sides 36 and 37 of translating tower 18 preferably include a pair of openings 36b and 37b therethrough for slidable engagement with guide rods 39 along jukebox 14 and substantially parallel to disc magazine 22. Each side 36 and 37 may further include an opening 36c and 37c therethrough for insertion of trigger member 48. Translating tower 18 includes a pair of tracks or rails 18a extending inwardly along a forward edge 36a and 37a of the respective sides 36 and 37 for slidable engagement with a sliding plate 26, on which disc carrier 16 may be mounted. Arm opening member or bracket 34 is preferably secured to side 37 of tower 18 and includes an engaging portion 34b extending from an attaching portion 34a, which is attached to side 37 (FIG. 2). Engaging portion 34b is spaced outwardly from forward face 19 and extends partially thereal-ong from attaching portion 34a such that an end 34c of engaging portion 34b is at least partially aligned with a flange 20f on clamping arm 20 for engagement therewith, as discussed below.

Figure 5:
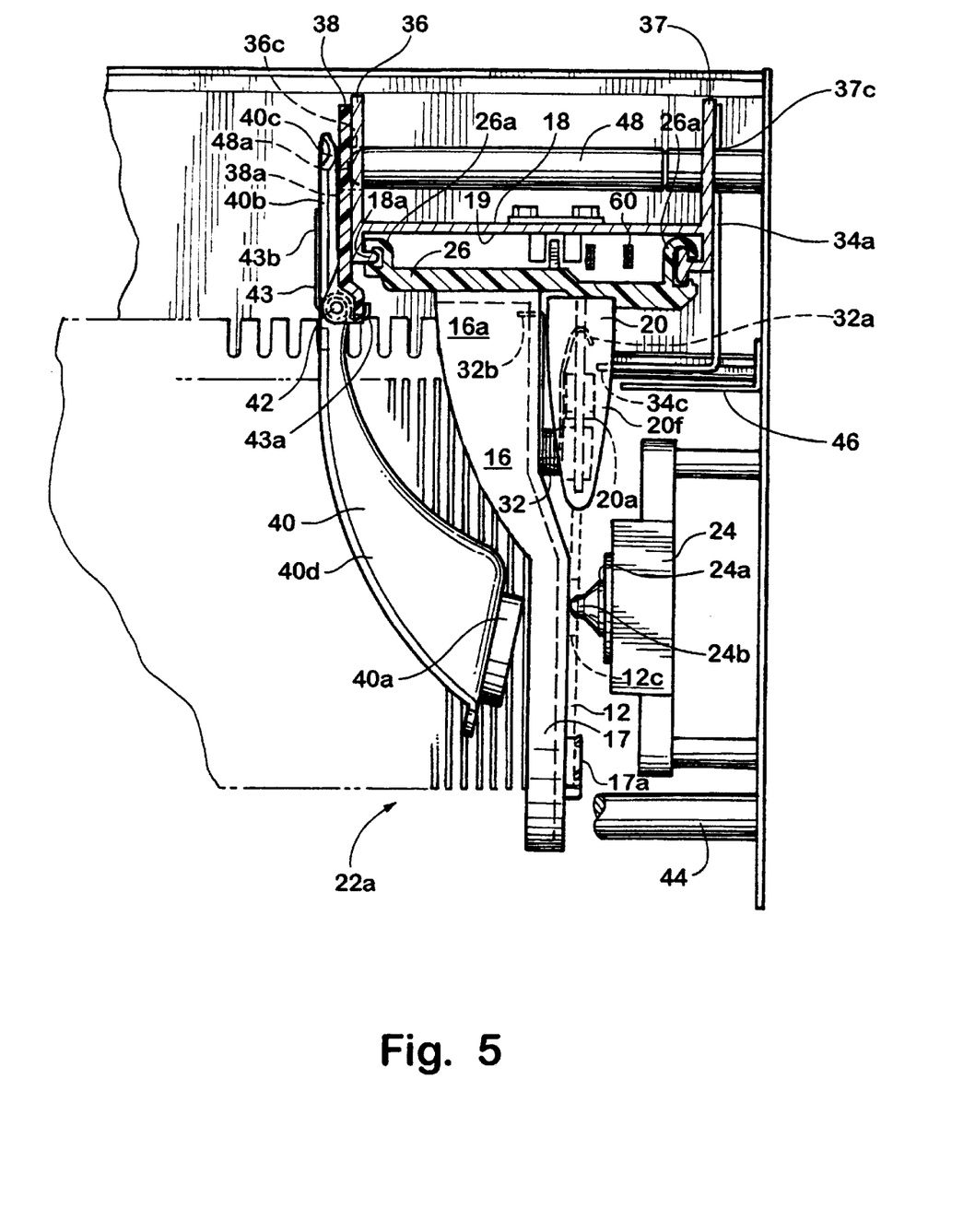
FIG. 5 is a top plan view of the disc changer and disc in the translation mode moving toward or away from the disc player.

Referring now to FIGS. 2 and 5, base portion 16a of disc carrier 16 may be mounted to sliding plate 26, which includes a pair of tracks 26a (FIG. 5) which are correspondingly formed for slidable engagement with the pair of tracks or rails 18a along translating tower 18. Preferably, the rails 18a protrude inwardly from each side 36 and 37 of sliding tower 18 such that sliding plate 26 is slidable between sides 36 and 37 and along forward face 19 of translating tower 18. Lifting bow 17 of disc carrier 16 extends outwardly from base portion 16a generally opposite from sliding plate 26. Lifting bow 17 is preferably arcuately formed such that it curves radially about the circumferential edge of the discs 22a stored in the disc magazine 22. Disc engaging or grabbing member 17a is positioned at distal end 17b of lifting bow 17 and is curved for substantially uniform engagement along a lower edge 12b of disc 12. Preferably, disc engaging member 17a includes a groove or trough therealong for receiving an edge 12b of disc 12 therein as disc 12 is lifted upwardly by disc carrier 16. A plurality of fingers 17c extend outwardly along disc engaging member 17a to guide the edge 12b of disc 12 into the trough or groove along disc engaging member 17a, and further to substantially preclude disc 12 from being dislodged therefrom as it is moved between magazine 22 and disc player 24. One or more additional grabbing members (not shown) may be included and spaced along lifting blow 17 to further secure disc 12 within disc carrier 16 when disc carrier 16 is in its second transportation mode above magazine 22. The additional grabbing member or members may be fixedly or movably mounted to lifting bow 17a nd engage disc 12 in response to movement of disc carrier 16 along translating tower 18. A stiffening flange 17d may also be included along lifting bow 17 in order to prevent flexing of lifting bow 17 as disc 12 is lifted upwardly and moved by disc changer 10.

Base portion 16a of disc carrier 16 further includes a pivot pin 28 extending longitudinally outwardly therefrom, on which clamping arm 20 is pivotally mounted. As best shown in FIGS. 2, 3 and 4, clamping arm 20 is preferably substantially L-shaped with a lower or downwardly extending leg 20c and an upper leg 20e. A curved, upper disc engaging or grabbing member 20a is positioned along a lower end 20b of downwardly extending leg 20c of clamping arm 20. Upper disc engaging member 20a is similar to lower disc engaging member 17a in that it is curved for uniform engagement with an edge 12a of disc 12 and includes a receiving groove therealong. A plurality of fingers 21 also extend outwardly from upper disc engaging member 20a on either side of the receiving groove to guide the edge of disc 12 into the groove. Clamping arm 20 further includes a mounting hole or opening 20d through a center portion for pivotally securing clamping arm 20 to pivot pin 28 on disc carrier 16. A biasing member 32 may also be interconnected between clamping arm 20 and disc carrier 16 to bias clamping arm 20 in a closed or clamping position as shown in FIGS. 3 and 4. For example, biasing member 32 may be a torsional spring wrapped or wound about pivot pin 28 and having one end 32a which engages leg 20c, while another end 32b (FIG. 5) engages a corresponding opening in disc carrier 16, such that the torsional spring 32 provides a biasing force on clamping arm 20 toward its closed position. Upper leg 20e of clamping arm 20 may extend substantially horizontally between pivot pin 28 and translating tower 18 when clamping arm 20 is in its closed position, as show in FIGS. 3 and 4. Preferably, upper leg 20e includes a flange 20f along its upper end for engagement with opening member 34. Opening member 34 preferably extends from side 37 and along sliding plate 26, such that engaging portion 34b engages and disengages a lower surface of flange 20f and causes clamping arm 20 to pivot about pivot pin 28 in response to a lowering and raising of disc carrier 16 along translating tower 18.

A disc holder or magnetic hub carrier 40 is movably mounted to translating tower 18. Preferably, disc holder 40 is pivotally mounted to a second pivot pin 42 on a holder bracket 38, which is mounted on translating tower 18. Disc holder 40 functions to pivot a magnetic hub 40a, or other means for rotatably securing the disc relative to the disc player, toward disc player 24 to engage and retain disc 12 in its operable position on disc player 24. Magnetic hub 40a is preferably a conventional radial magnet which retains the disc 12 on disc player 24 while allowing disc 12 to be rotated and played or read by disc player 24. Preferably, a pivot arm 40b extends from pivot pin 42 along bracket 38 and side 36 of translating tower 18. An engaging end 40c of pivot arm 40b extends over and at least partially obstructs opening 36c in side 36 and a corresponding opening 38a in bracket 38. A support arm 40d, which supports magnetic hub 40a, extends outwardly from pivot pin 42 in a generally opposite direction from pivot arm 40b, such that movement of end 40c of pivot arm 40b causes a corresponding movement of magnetic hub 40a as disc holder 40 pivots about pivot pin 42.

Disc holder 40 is preferably biased in an open or non-engaging orientation by a biasing member 43, such that pivot arm 40b is substantially adjacent to bracket 38 and/or side 36 of translating tower 18 while magnetic hub 40a is correspondingly spaced from a vertical plane defined by lifting bow 17. Preferably, biasing member 43 is a torsional spring coiled around pivot pin 42 and interconnected between pivot arm 40b and hub carrier bracket 38, with one end 43a engaging bracket 38 and another end 43b extending along pivot arm 40b and exerting a force on pivot arm 40b toward tower 18. However, other means for moving magnetic hub 40a to engage disc 12 on disc player 24 may be implemented without affecting the scope of the present invention, such as a coil spring or electric motor or the like. For example, disc holder 40 may be a conventional motor driven carrier which is electronically operable to move magnetic hub 40a into position for engagement of disc 12 as tower 18 approaches disc player 24.

Disc player 24 is preferably fixedly mounted to a player mounting tower or a portion of sidewall 14a at a height substantially greater than an upper portion 22b (FIG. 4) of the edge of the discs 22a within disc magazine 22. Disc player 24 is preferably a conventional stationary CD player and includes a center hub 24a for receiving the disc 12 thereon. As best shown in FIGS. 1 and 5, hub 24a preferably includes a guide 24b extending outwardly from hub 24a to engage an opening 12c in the center of disc 12 in order to properly align disc 12 with disc player 24. Disc player 24 functions to both rotate the disc at high rpm's and to read or play the tracks associated with the disc after disc 12 has been received by hub 24a and magnetic hub 40a has been moved into place substantially adjacent to disc 12 on a side generally opposite from disc player 24.

Although not critical to the present invention, disc magazine or rack 22 is preferably a substantially straight rack which holds the discs or CDs 22a in a substantially linear fashion by a lower outer edge of each disc, without contacting the playing surfaces of the discs more than preferably ¹⁄₁₆th of an inch from their perimeter edges. However, the rack could be other shapes such as curved. Preferably, the discs 22a are separated within magazine 22 by a minimal distance, so as to maximize the number of discs that may be held within magazine 22, but at a great enough distance apart to avoid creating static during operation. The magazine's disc storage capability is preferably flexible such that different size disc changing mechanisms may be implemented, and may accommodate 60 to 160 discs in increments of 20 discs. This allows disc magazine 22 to fit within the space constraints of conventional wall-mounted jukeboxes, and further allows multiple discs to be replaced at once. Although shown and described as a straight rack, the scope of the present invention further includes a magazine 22 which may have a curved rack or the like, which curves substantially parallel to correspondingly curved guide rods for guiding the translating tower along the curved path.

Magazine 22 may be secured along a lower portion or base 14c (FIG. 1) of jukebox 14 in a conventional manner. Preferably, as best shown in FIG. 1, magazine 22 may be secured within jukebox 14 by a pair of rods 52 protruding from lower portion 14c and engaging a set of corresponding arms or brackets 22c extending outwardly from each end 22d of magazine 22. This allows magazine 22 to be easily removable from jukebox 14 without requiring special tools, such that the magazine may easily be replaced. Magazine 22 may further include a handle 54 pivotally attached at each end thereof to further facilitate easy removal and replacement of magazine 22 within jukebox 14. However, clearly other forms of securing the magazine to the jukebox may be implemented without effecting the scope of the present invention.

Disc changer 10 and translating tower 18 are preferably operable by a conventional drive system (not shown) for accurately and repeatedly moving disc carrier 16 substantially vertically along tower 18 and/or moving translating tower 18 substantially horizontally along guide rods 39. Such a drive system may include a servo motor, a stepper motor, or other known drives capable of accurate positioning. A selected disc 12 may be removed from magazine 22 by disc carrier 16 and clamping arm 20 and then moved to disc player 24 for playing the selected track. The drive system also functions to return the selected disc 12 to its position in magazine 22 after the selected track has been played by disc player 24. Preferably, disc carrier 16 is raised and lowered along translating tower 18 by a drive system which includes a driven cog sheave (not shown), which is interconnected to a second cog sheave 58 via a cogged drive belt 60. Sliding plate 26 or base portion 16a of disc carrier 16 may then be interconnected to a portion of drive belt 60, such that rotation of the driven cog sheave causes an upward or downward movement of disc carrier 16 via a corresponding vertical movement of drive belt 60. Similarly, translating tower 18 is movable in a horizontal direction by a second cogged drive belt 64 extending between a second set of cog sheaves (not shown) which are positioned substantially adjacent to the opposite sidewalls 14a and 14b of jukebox 14. Translating tower 18 may then be interconnected to a portion of the second cogged drive belt 64, such that rotation of a second driven cog sheave causes horizontal translation of translating tower 18, which is guided by guide rods 39, due to the corresponding movement of the second drive belt 64.

The player mounting tower or sidewall 14a, translating tower 18, disc magazine 22, and the drive system are all mounted to the base 14c of the jukebox 14. The base 14c also may house the control computer. For serviceability, jukebox 14 is preferably designed so that the disc changer 10 can be easily removed therefrom without the use of any special tools. A cover (not shown) is also preferably included to protect the components from dirt, dust, smoke, and the like. The cover may also be easily installed and removed from jukebox 14 for access to the discs 22a and disc changer 10. Because the disc changer may be displayed to the customer using the jukebox, the changer cover is also preferably aesthetically pleasing.

Referring now sequentially to FIGS. 2, 3 and 4, the following discussion details the operation of the disc changer of the present invention. As shown in FIG. 2, when disc carrier 16 is in a lowered position on translating tower 18, lower disc engaging member 17a of lifting bow 17 is spaced downwardly from a lower portion of the edges of the discs 22a in magazine 22. In this lowered position, end 34c of engaging member 34 is engaged with an underside of flange 20f, which lifts upper leg 20e of clamping arm 20 upwardly such that clamping arm 20 pivots about pivot pin 28, thereby spacing disc engaging member 20a of lower leg 20c from the upper edges of the discs 22a within disc magazine 22. Accordingly, while disc carrier 16 is at this lower position, neither of disc engaging members 17a and 20a are engaged with the edge of any disc in magazine 22. Disc carrier 16 and translating tower 18 are thus free to move horizontally along disc magazine 22 to align disc engaging members 17a and 20a with the edges of a disc 12 within magazine 22. When a selection is made, the drive system actuates the driven cog sheave on the jukebox to move the translating tower horizontally to the disc. Once disc carrier 16 is aligned with the disc 12, the drive system actuates the driven cog sheave on translating tower 18 to raise the disc carrier 16 upwardly along translating tower 18.

Referring now to FIG. 3, as disc carrier 16 is raised upwardly, lower disc engaging member 17a correspondingly rises upwardly to contact lower edge 12b of disc 12. Simultaneously, clamping arm 20 rises upwardly relative to opening member 34, which allows upper leg 20e of clamping arm 20 to pivot downwardly as flange 20f disengages end 34c of member 34. Clamping arm 20 continues to pivot about pivot pin 28 until upper disc engaging member 20a engages upper edge 12a of disc 12. Preferably, the locations of engagement of the disc engaging members 17a and 20a are substantially diametrically opposite to one another on disc 12, such that disc 12 is gently squeezed by the disc engaging members 17a and 20a and thus positively secured therebetween. However, other positions along the edge of the disc are clearly within the scope of the present invention. Furthermore, three or more disc engaging members may be implemented around the disc, with at least one of the disc engaging members being movable in response to the movement of the disc carrier along the translating tower, without affecting the scope of the present invention.

Biasing member 32 on clamping arm 20 provides enough force to maintain clamping arm 20 engaged with the disc 12 as disc 12 is lifted upwardly out from magazine 22 by disc carrier 16. By securing disc 12 in such a manner, the disc 12 is positively secured regardless of the orientation of disc carrier 16, thereby allowing disc carrier 16 to quickly transfer the disc to disc player 24 and back, and to alternately transfer the disc along a non-horizontal path, or even vertically, without causing the disc to be dislodged therefrom. Although disc carrier 16 positively secures disc 12, the engaging members 17a and 20a are designed to hold the disc 12 on its outer edges without contacting the flat surfaces of the disc so that the readable surface of the disc will not be damaged while it is moved between magazine 22 and disc player 24.

As shown in FIG. 4, the drive system continues to raise disc carrier 16 upwardly along translating tower 18 until a lowermost portion 12d of disc 12 is at a height greater than an upper edges 22b of the discs 22a remaining in magazine 22. Once disc 12 has been raised to this position, translating tower 18, along with disc carrier 16 and disc 12, may be moved horizontally above and along magazine 22 toward disc player 24 at sidewall 14a of jukebox 14. The drive system may then actuate the driven cog sheave on the jukebox to move tower 18 laterally a predetermined distance for proper engagement of disc 12 with disc player 24.

Referring now to FIG. 5, as translating tower 18 moves horizontally along magazine 22, disc holder 40 is positioned such that magnetic hub 40a is spaced from disc 12 and disc carrier 16. Pivot arm 40b of disc holder 40 is biased by biasing member 43 so that pivot arm 40b rests on disc holder bracket 38 substantially adjacent to side 36 of translating tower 18. As translating tower 18 approaches disc player 24, trigger member 48 extends through openings 36c and 37c in respective sides 36 and 37 of translating tower 18 and further through opening 38a in bracket 38 until an end 48a of trigger 48 contacts the end 40c of pivot arm 40b of disc holder 40. While trigger 48 engages translating tower 18 and disc holder 40 in this manner, opening 12c in the center of disc 12 simultaneously engages the guide 24b on hub 24a of disc player 24.

Figure 6:
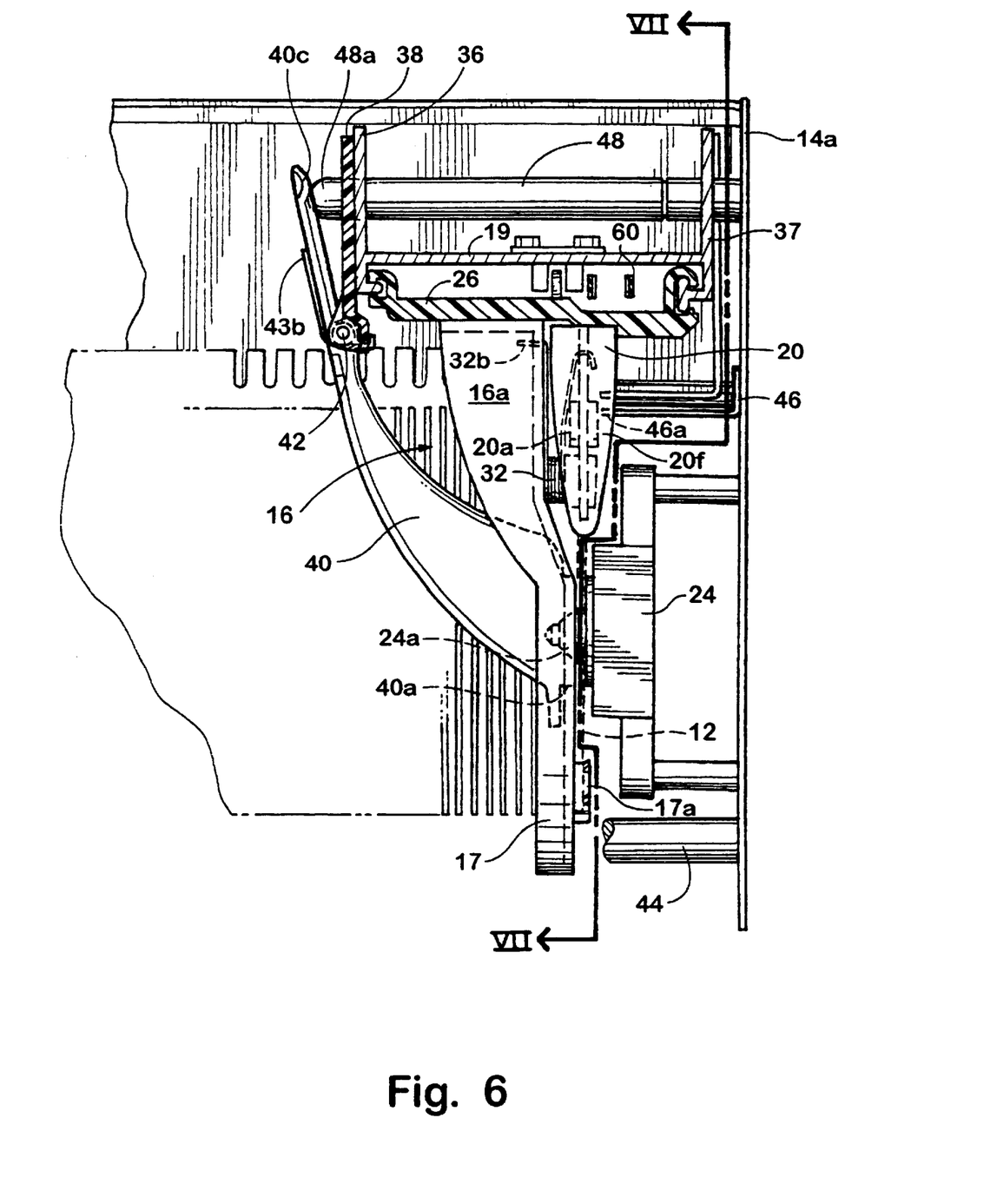
FIG. 6 is a plan view similar to FIG. 5, with the disc secured to the player.

As shown in FIG. 6, further movement of translating tower 18 toward disc player 24 results in end 48a of trigger 48 pushing the end 40c of pivot arm 40b on disc holder 40 away from bracket 38 and side 36 of translating tower 18. This further results in disc holder 40 pivoting about pivot pin 42, such that magnetic hub 40a engages selected disc 12 and hub 24a of disc player 24. While disc holder 40 pivots to engage selected disc 12, the disc 12 is further moved toward disc player 24 until player hub 24a is fully engaged therewith. Once disc 12 is fully engaged with player hub 24a and magnetic hub 40a, disc 12 is rotatably secured to disc player 24. Releasing member 46 extends out a predetermined distance from the sidewall 14a of the jukebox, such that an outer end or engaging portion 46a of releasing member or bracket 46 is positioned beneath flange 20f of clamping arm 20 on disc carrier 16 when disc 12 is fully engaged with disc player 24. The drive system stops horizontal movement of translating tower 18 at this point, since the disc 12 is now in position for playing on disc player 24.

Figure 7:
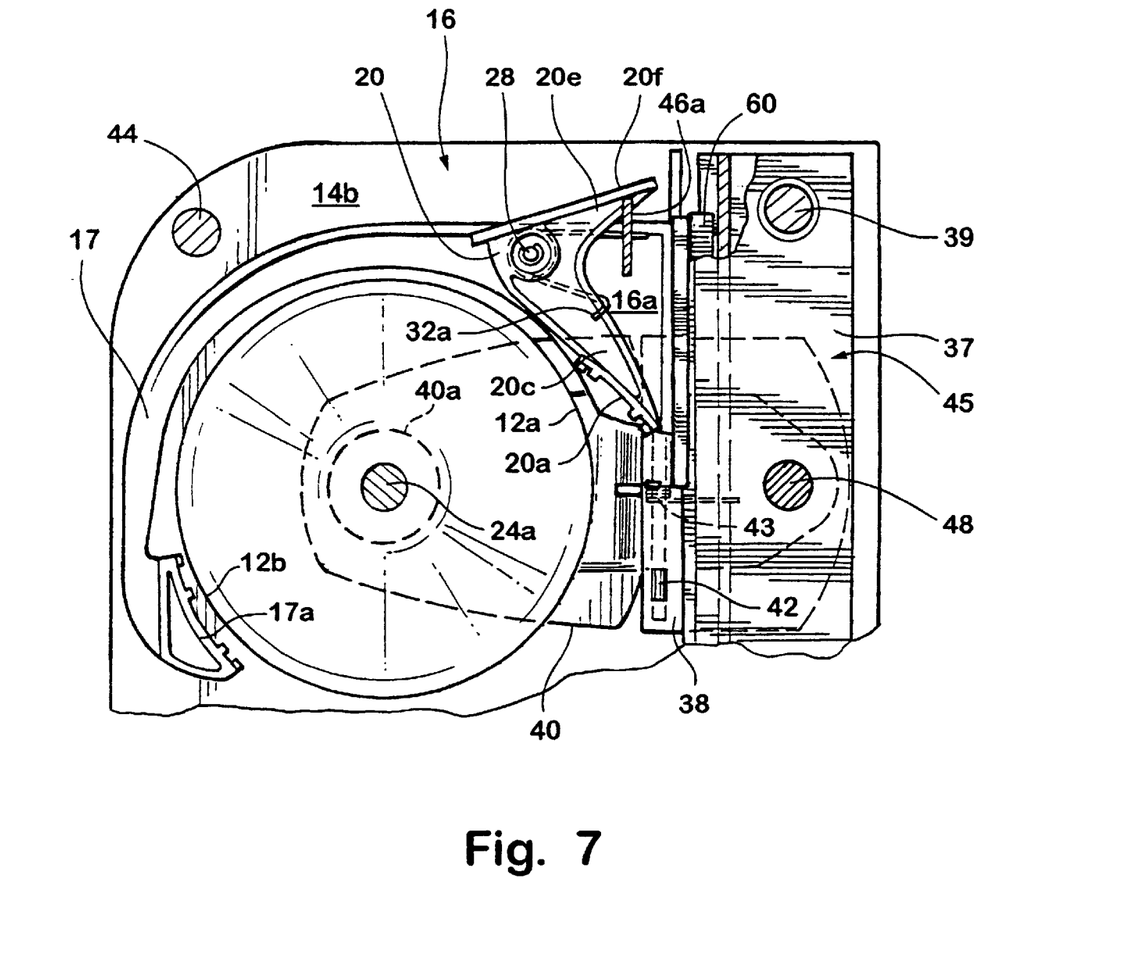
FIG. 7 is a partial sectional along the line VII—VII in FIG. 6, with the clamping arm in an open position to deposit or receive the selected disc.

Once the selected disc 12 is in position for playing on disc player 24, the drive system then rotates the drive wheel on translating tower 18 to lower disc carrier 16 a predetermined amount, as shown in FIG. 7. The lowering of disc carrier 16 causes engaging portion 46a of releasing member 46 to contact flange 20f of clamping arm 20, which further causes clamping arm 20 to pivot about pivot pin 28 in a similar manner as discussed above with respect to its engagement with engaging bracket 34. Accordingly, disc engaging member 20a of clamping arm 20 pivots away from edge 12a of selected disc 12, while lower disc engaging member 17a correspondingly moves downwardly away from lower edge 12b of disc 12, thereby releasing disc 12 from disc carrier 16 such that only magnetic hub 40a and hub 24a are holding disc 12 to disc player 24. Selected disc 12 is now free to rotate and be played by disc player 24 in a conventional manner.

After the selected track on disc 12 has been played by disc player 24, the process discussed above is reversed to return disc 12 to its original position on magazine 22. The drive system operates to raise disc carrier 16 upwardly to disengage releasing member 46 from flange 20f of clamping arm 20, while lower disc engaging member 17a again correspondingly engages lower edge 12b of disc 12, thereby positively securing disc 12 between disc engaging members 17a and 20a. Translating tower 18 may then be moved horizontally away from disc player 24 to return selected disc 12 to magazine 22. As translating tower 18 moves away from disc player 24, disc holder 40 pivots about pivot pin 42 while end 40c of disc holder 40 disengages from trigger or rod 48, thereby pivoting magnetic hub 40a away from disc 12 due to the return force exerted by biasing member 43. Translating tower 18 continues to move away from disc player 24 until disc 12 is directly above its original location on magazine 22. Disc carrier 16 may then be lowered by the drive system until opening bracket 34 on translating tower 18 again engages flange 20f of clamping arm 20 in order to pivot or open clamping arm 20 until upper disc engaging member 20a no longer engages edge 12a of disc 12. Lower disc engaging member 17a on lifting bow 17 is again correspondingly moved below edge 12b of disc 12, such that disc carrier 16 is again free to move horizontally along magazine 22 to the next selected disc.

Although shown and described as having a bracket 38 and disc holder 40 which pivot about a pivot pin 42 in response to biasing member 43 and/or contact of trigger 48 with pivot arm 40b, clearly the scope of the present invention includes a magnetic hub carrier or other disc holder which is movable in response to contact or interconnection with any other structure or member capable of causing a mechanical movement of a magnetic hub or the like for engaging and disengaging selected disc 12 on player hub 24a of disc player 24. In an alternate embodiment of the present invention, a disc holder associated with disc changer 10 may engage and disengage the disc player in a conventional manner. For example, a magnetic hub may be pivoted or otherwise moved into position by an electronic motor which swings or pivots a magnetic hub holder until the magnetic hub is positioned adjacent to the disc as the disc is engaged with the disc player. On the other hand, it is also envisioned that the mechanical pivoting of disc holder 40 by trigger member 48, without implementation of a conventional electronic motor, may be implemented on other known disc changing mechanisms which provide for movement of a disc between a disc rack or magazine and a disc player in a conventional manner.

Figure 8:
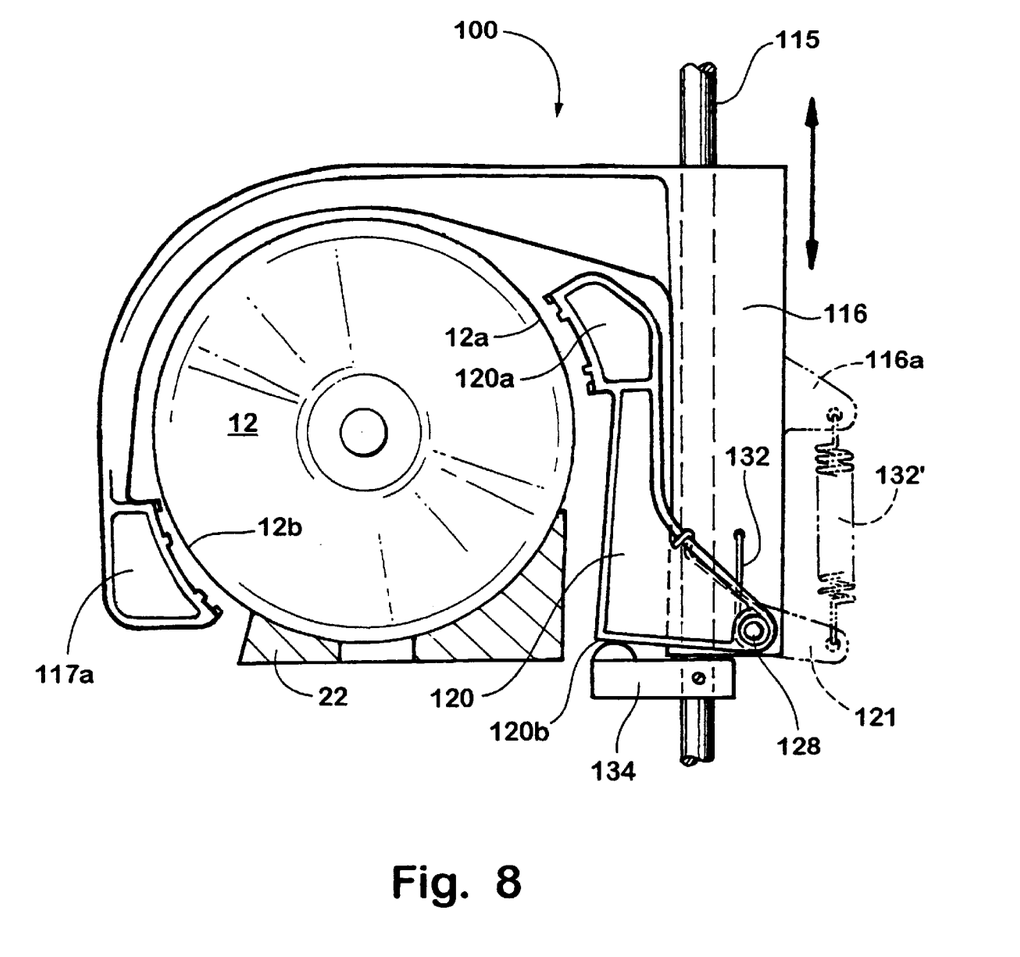
FIG. 8 is a side elevation of an alternate embodiment of the disc changer of the present invention.

In an alternate embodiment, as shown in FIG. 8, a disc changer 100 includes a clamping arm 120, which may extend upwardly from a pivot pin 128 on a disc carrier 116. Clamping arm 120 may be biased in a closed or clamping position by a biasing member 132, which may be a torsional spring or the like. Alternately, clamping arm 120 may include a spring connecting arm 121 extending from its lower end which is interconnected with an extension 116 *a* on disc carrier 116 by a biasing member 132', such as a coil spring or the like, as shown in phantom in FIG. 8. Clamping arm 120 functions in a similar manner to clamping arm 20 discussed above. Briefly, as disc carrier 116 is lowered along a translating tower or a vertical guide rod 115 associated therewith, a stop block or opening member 134 secured to guide rod 115 or along the translating tower contacts a lower end 120*b* of clamping arm 120, thereby pivoting clamping arm 120 about pivot pin 128 such that an upper disc engaging member 120*a* pivots away from the edges of the discs within the disc magazine 22 and upwardly and/or toward the translating tower. When the disc carrier 116 is at a selected disc, disc carrier 116 is moved upwardly, away from stop block 134, whereby a return force exerted by biasing member 132 or 132' pivots clamping arm 120 about pivot pin 128. Disc engaging member 120*a* correspondingly moves outwardly from the translating tower and toward an edge 12*a* of the selected disc 12 within the disc magazine until the member 120*a* engages selected disc 12. A lower disc engaging member 117*a* correspondingly engages a generally opposite edge 12*b* of the disc 12 in a similar manner as discussed above with respect to disc engaging member 17*a* of lifting bow 17.

Although the embodiments of the present invention are shown and described with a torsional or coil spring causing a clamping arm to pivot to contact the edge of a disc with a contacting or clamping surface, it is envisioned that the scope of the present invention includes other forms of clamping arms and biasing members which may be formed and oriented in other manners such that the disc engaging members are moved away from the edges of the discs within the magazine as the disc carrier is lowered or otherwise moved toward a disengaged position and, conversely, moved toward the edges of the discs as the disc carrier is raised or otherwise moved toward an engaged position, thereby engaging and positively securing the disc within the disc carrier. The engaging members may also contact the disc at other areas along the edges of the disc without affecting the scope of the present invention. Furthermore, additional engaging members may be included for engaging additional portions of the edge of a disc with at least one member being movable in response to a movement of the disc carrier, without affecting the scope of the present invention. For example, three engaging members may be included such that two are spaced along an arcuate lifting bow and one is movably mounted to the disc carrier. Preferably, the three engaging members would be equally spaced around the disc to positively secure the disc therebetween.

Furthermore, although shown and described as including a vertically moving disc carrier on a horizontally moving translating tower, it is further envisioned that the present invention may include a horizontally moving disc carrier on a vertically moving translating tower or any other orientation of disc carriers and towers. This is possible due to the positive securement of the selected disc between two or more the disc engaging members as the selected disc is removed from the magazine by the disc carrier. By positively securing the selected disc between the two or more members, the disc carrier of the present invention may be oriented and moved in directions other than those described above, yet still substantially preclude dislodgment of the selected disc from the disc engaging members as the disc is transported between the magazine and the player.

Therefore, a CD or disc changer is provided that is simple in design, with a minimal number of intricate and/or movable parts, and compact so as to take up a minimal amount of space within a jukebox. The disc changer positively secures a selected disc within a disc carrier, which allows the carrier to be moved quickly and at varying angles, while substantially precluding the possibility that the disc may be dislodged from the carrier. Preferably, the selected disc is lifted upwardly from a substantially horizontal disc rack, although other orientations of the rack and disc carrier which allow a disc to be removed from the rack and transported to a disc player may be implemented without affecting the scope of the present invention. Additionally, a magnetic hub or the like may be movably or pivotally secured to the translating tower such that the hub is mechanically moved to a position where it may rotatably secure the selected disc to the disc player for playing or reading a selected track. By minimizing the number of moving parts and overall movement of the selected CDs or discs, the time elapsed between the end of one song and the beginning of the next may also be minimized. Furthermore, the cost of manufacturing and servicing the present invention are minimized since the components do not include multiple complex, fragile and/or moving parts.

Changes and modifications in the specifically described embodiments can be carried out without departing from the principles of the invention, which is intended to be limited only by the scope of the appended claims, as interpreted accordingly to the principles of patent law.

The embodiments of the invention in which an exclusive property right or privilege is claimed are defined as follows:

1. A jukebox comprising:

a disc player;

a translating tower;

a disc carrier for exchanging a disc between a rack of discs and said disc player;

a drive system operable to move said disc carrier and said translating tower, said disc carrier being mounted to move along said translating tower, said disc carrier having at least two disc grabbing members, at least one of said at least two disc grabbing members being movable in response to a movement of said disc carrier along said translating tower, said at least one of said at least two disc grabbing members being movable between a disc engaging position and a disc releasing position, wherein said at least one of said at least two disc grabbing members is mounted on a clamping arm, said clamping arm being pivotally mounted to said disc carrier such that said clamping arm pivots said at least one of said at least two disc grabbing members about a pivot axis in response to said movement of said disc carrier; and a biasing member, said biasing member biasing said at least one of said at least two disc grabbing members in said disc engaging position.

2. The jukebox of claim 1, wherein said at least one of said at least two disc grabbing members engages an edge of the disc in said disc engaging position, another of said at least two disc grabbing members correspondingly engaging an edge of the disc as said at least one of said at least two disc grabbing members engages the edge of the disc.

3. The jukebox of claim 2, wherein when said disc carrier is moved in a first direction, said at least one of said at least two disc grabbing members is movable to engage a first portion of an edge of the disc while said other of said at least two disc grabbing members moves with said disc carrier and engages a second portion of the edge of the disc, thereby positively securing the disc between said at least two disc grabbing members, and when said disc carrier is moved in a second direction, said at least one of said at least two disc grabbing members is movable to disengage the disc and said other of said at least two disc grabbing members moves with said disc carrier to disengage the disc, said first direction being generally opposite said second direction.

4. The jukebox of claim 3, wherein the disc has a diameter, said first portion of the edge of the disc being generally diametrically opposite said second portion of the edge of the disc.

5. The jukebox of claim 1, wherein at least one other of said at least two disc grabbing members is fixedly interconnected to said disc carrier.

6. The jukebox of claim 5, wherein when said disc carrier moves along said translating tower in a first direction, said at least one of said at least two disc grabbing members moves to said disc engaging position while said at least one other of said at least two disc grabbing members moves with said disc carrier in said first direction to engage the edge of the disc.

7. The jukebox of claim 1, wherein said disc carrier is movable generally vertically along said translating tower.

8. The jukebox of claim 1, wherein said disc carrier is movable generally horizontally along said translating tower.

9. The jukebox of claim 1, wherein said biasing member is a torsional spring.

10. The jukebox of claim 1, wherein said biasing member is a coil spring.

11. The jukebox of claim 1, wherein said translating tower includes a disc holder which is movable to engage the disc when the disc is positioned adjacent to said disc player, said disc holder rotatably securing the disc to said disc player.

12. The jukebox of claim 11, wherein said disc holder is movable in response to activation of an electronic control.

13. The jukebox of claim 11, wherein said disc holder is movable in response to a movement of said translating tower toward said disc player.

14. A jukebox comprising:
   a disc player;
   a translating tower;
   a disc carrier for exchanging a disc between a rack of discs and said disc player; and
   a drive system operable to move said disc carrier and said translating tower, said disc carrier being mounted to move along said translating tower, said disc carrier having at least two disc grabbing members, at least one of said at least two disc grabbing members being movable in response to a movement of said disc carrier along said translating tower, said at least one of said at least two disc grabbing members being movable between a disc engaging position and a disc releasing position, wherein said at l east one of said at least two disc grabbing members is mounted on a clamping arm, said clamping arm being pivotally mounted to said disc carrier such that said clamping arm pivots said at least one of said at least two disc grabbing members about a pivot axis in response to said movement of said disc carrier, wherein said translating tower includes an opening member which engages said clamping arm and causes said clamping arm to move between an open position and a closed position, when said disc carrier moves in a second direction along said translating tower said opening member is engageable with said clamping arm to move said clamping arm to said open position whereby said at least one of said at least two disc grabbing members is moved to said disc releasing position, and when said disc carrier is moved in a first direction along said translating tower, said opening member is disengageable from said clamping arm such that said clamping arm moves to a closed position whereby said at least one of said at least two disc grabbing members is moved to said disc engaging position, said first direction being generally opposite to said second direction.

15. The jukebox of claim 14, wherein said first and second directions are generally vertically along said translating tower.

16. The jukebox of claim 15, wherein said first direction is generally upwardly and said second direction is generally downwardly.

17. A jukebox comprising:
   a disc player;
   a translating tower, said translating tower including a disc holder which is movable to engage the disc when the disc is positioned adjacent to said disc player, said disc holder rotatably securing the disc to said disc player, wherein said disc holder is movable in response to a movement of said translating tower toward said disc player, wherein said disc holder is movable in response to an engagement with a trigger member;
   a disc carrier for exchanging a disc between a rack of discs and said disc player; and
   a drive system operable to move said disc carrier and said translating tower, said disc carrier being mounted to move along said translating tower, said disc carrier having at least two disc grabbing members, at least one of said at least two disc grabbing members being movable in response to a movement of said disc carrier along said translating tower, said at least one of said at least two disc grabbing members being movable between a disc engaging position and a disc releasing position.

18. The jukebox of claim 17, wherein said disc holder includes a pivot arm, said disc holder pivoting about a pivot axis in response to said pivot arm engaging said trigger member such that said disc holder correspondingly engages the disc.

19. The jukebox of claim 17, wherein said trigger member is fixedly interconnected with said disc player, said trigger member extending toward said translating tower and engaging said pivot arm as said translating tower moves toward said disc player.

20. A jukebox comprising:
   a disc magazine for holding a plurality of discs;
   a disc player for engaging and playing a disc selected from said plurality of discs;
   a drive system for moving the disc between said disc magazine and said disc player;
   a translating tower movable along said disc magazine by said drive system; and
   a disc carrier for at least occasionally supporting the disc as the disc is transported between said disc magazine and said disc player by said drive system, said disc carrier being slidably mounted to said translating tower and slidable in a first direction by said drive system, said disc carrier including at least two disc engaging portions, said at least two disc engaging portions comprising first and second disc engaging portions, said first disc engaging portion being mounted to a clamping arm which is pivotally mounted to said disc carrier, when said disc carrier is in a first position, said at least two disc engaging portions are positioned remotely from an edge of said plurality of discs in said disc magazine, and when said disc carrier is moved in said first direction from said first position, said first disc engaging portion moves toward an edge of the disc in response to said movement of said disc carrier in said first direction, and said second disc engaging portion moves with said disc carrier in said first direction toward said edge of the disc, said at least two disc engaging portions thereby contacting and securing the disc therebetween as said disc carrier is moved by said drive system in said first direction, said disc carrier including an arcuate section extending at least partially around the discs in said disc magazine when said disc carrier is in said first position, said second disc engaging portion being fixedly positioned at said distal end of said arcuate section from said translating tower, said clamping arm pivoting in response to movement of said disc carrier such that said first disc engaging portion is pivoted toward said edge of the disc in response to said movement of said disc carrier in said first direction, wherein said disc carrier includes a biasing member, said clamping arm being biased by said biasing member in a closed position, where said first disc engaging portion engages an edge of the disc.

21. The jukebox of claim 20, wherein said disc carrier is movable vertically along said translating tower.

22. The jukebox of claim 20, wherein said disc carrier is movable horizontally along said translating tower.

23. The jukebox of claim 20, wherein the disc has a diameter such that said first disc engaging portion is substantially diametrically opposite said second disc engaging portion when said first and second disc engaging portions engage the disc.

24. The jukebox of claim 20 further including a first opening member interconnected with said translating tower, said first opening member engaging said clamping arm when said disc carrier is in said first position, thereby remotely positioning said first disc engaging portion from said edge of the disc, as said disc carrier is moved in said first direction, said first opening member disengages said clamping arm and said biasing member pivots said clamping arm such that said first disc engaging portion engages said edge of the disc.

25. The jukebox of claim 24 further including a second opening member interconnected with said disc player, when the disc is engaged with said disc player said second opening member engages said clamping arm in response to a movement of said disc carrier in a second direction, such that said first engaging portion is disengaged from the disc, said second direction being generally opposite said first direction.

26. The jukebox of claim 20, wherein said translating tower includes a disc holder for rotatably securing the disc to said disc player.

27. The jukebox of claim 26, wherein said disc holder is movable for engagement of the disc when the disc is positioned adjacent to said disc player.

28. A jukebox comprising:
a disc magazine for holding a plurality of discs;
a disc player for engaging and playing a disc selected from said plurality of discs;
a drive system for moving the disc between said disc magazine and said disc player;
a translating tower movable along said disc magazine by said drive system, said translating tower including a disc holder for rotatably securing the disc to said disc player, said disc holder being movable for engagement of the disc when the disc is positioned adjacent to said disc player, wherein said disc holder is movably attached to said translating tower, said disc holder being movable in response to a portion of said disc holder engaging a trigger which is fixedly interconnected with said disc player; and
a disc carrier for at least occasionally supporting the disc as the disc is transported between said disc magazine and said disc player by said drive system, said disc carrier being slidably mounted to said translating tower and slidable in a first direction by said drive system, said disc carrier including at least two disc engaging portions, at least one of said at least two disc engaging portions being movably mounted to said disc carrier, when said disc carrier is in a first position, said at least two disc engaging portions are positioned remotely from an edge of said plurality of discs in said disc magazine, and when said disc carrier is moved in said first direction from said first position, said at least one of said at least two disc engaging portions moves toward an edge of the disc in response to said movement of said disc carrier in said first direction, at least one other of said at least two disc engaging portions moves with said disc carrier in said first direction toward said edge of the disc, said at least two disc engaging portions thereby contacting and securing the disc therebetween as said disc carrier is moved by said drive system in said first direction.

29. The jukebox of claim 28, wherein said disc carrier includes an arcuate section extending at least partially around the discs in said disc magazine when said disc carrier is in said first position, said at least one other disc engaging portion being positioned at a distal end of said arcuate section from said translating tower.

30. The jukebox of claim 29, wherein said at least two disc engaging portions comprise first and second disc engaging portions, said first disc engaging portion being movably mounted to said disc carrier and said second disc engaging portion being fixedly positioned at said distal end of said arcuate section.

31. The jukebox of claim 30, wherein said first disc engaging portion is mounted to a clamping arm which is pivotally mounted to said disc carrier, said clamping arm pivoting in response to movement of said disc carrier such that said first disc engaging portion is pivoted toward said edge of the disc in response to said movement of said disc carrier in said first direction.

32. The jukebox of claim 28, wherein said disc holder is pivotally attached to said translating tower such that said disc holder is pivotable about a pivot axis in response to said portion of said disc holder engaging said trigger.

33. The jukebox of claim 32, wherein said disc holder includes a biasing member to bias said disc holder in an open position where said disc holder is spaced from the disc on said disc carrier.

34. The jukebox of claim 33, wherein said biasing member is a torsional spring.

35. A jukebox for playing a disc comprising:
a disc player for playing the disc, said disc player being fixedly secured to a structure;
a disc carrying assembly for at least occasionally engaging and carrying the disc to and from said disc player, said disc carrying assembly being operable to secure the disc onto said disc player in response to a movement of said disc carrying assembly toward said disc player;
a drive system operable to move said disc carrying assembly toward said disc player for playing the disc and away from said disc player to return the disc to an original storage position; and a trigger member for engaging a disc holding portion of said disc carrying assembly in response to said movement of said disc carrying assembly toward said disc player such that said disc holding portion of said disc carrying assembly correspondingly moves to secure the disc to said disc player.

36. The jukebox of claim 35 further including a translating assembly interconnected to said disc carrying assembly, said translating assembly being operable to translate said disc carrying assembly to and from said disc player, said drive system being operable to move said translating assembly to and from said disc player.

37. The jukebox of claim 36, wherein said trigger member is interconnected with said structure and extending from said structure toward said translating assembly.

38. The jukebox of claim 35, wherein said disc holding portion of said disc carrying assembly includes a disc holder movably interconnected with said disc carrying assembly for securing the disc to said disc player when the disc is positioned adjacent to said disc player, said trigger member engaging said disc holder as said disc carrying assembly moves toward said disc player.

39. The jukebox of claim 35, wherein said portion of said disc carrying assembly includes a disc holder pivotally interconnected with said disc carrying assembly for securing the disc to said disc player as the disc is moved toward said disc player.

40. A jukebox for playing a disc comprising:
a disc player for playing the disc, said disc player being fixedly secured to a structure;
a disc carrying assembly for at least occasionally engaging and carrying the disc to and from said disc player, said disc carrying assembly being operable to secure the disc onto said disc player in response to a movement of said disc carrying assembly toward said disc player, said disc carrying assembly including a disc holder pivotally interconnected with said disc carrying assembly for securing the disc to said disc player as the disc is moved toward said disc player;
a drive system operable to move said disc carrying assembly toward said disc player for playing the disc and away from said disc player to return the disc to an original storage position; and
a trigger member for engaging an arm of said disc holder in response to said movement of said disc carrying assembly toward said disc player such that a securing end of said disc holder correspondingly moves to secure the disc to said disc player.

41. The jukebox of claim 40, wherein said securing end of said disc holder includes a magnetic hub for rotatably securing the disc to said disc player.

42. The jukebox of claim 40, wherein said disc holder includes a biasing member to bias said disc holder in a disengaged position, where said securing end of said disc holder is spaced from the disc when said trigger member is not engaged with said pivot arm of said disc holder.

43. The jukebox of claim 42, wherein said biasing member is a torsional spring.

44. The jukebox of claim 40, wherein said disc carrying assembly includes at least two disc grabbing members, at least one of said at least two disc grabbing members being movably mounted to said disc carrying assembly, said at least two disc grabbing members being operable to positively secure an edge of the disc therebetween in response to a movement of said disc carrying assembly.

45. The jukebox of claim 44 further including a translating assembly interconnected to said disc carrying assembly, said translating assembly operable to translate said disc carrying assembly to and from said disc player, said disc carrying assembly being slidably mounted on said translating assembly, said at least one of said at least two disc grabbing members being mounted to a clamping arm pivotally mounted to said disc carrying assembly, said clamping arm being pivotable in response to said disc carrying assembly being moved along said translating tower such that said at least one of said at least two disc grabbing members correspondingly moves to engage a first portion of an edge of the disc while at least one other of said at least two disc grabbing members moves with said disc carrying assembly to engage a second portion of the edge of the disc.

46. The jukebox of claim 45, wherein the disc has a diameter and said at least one of said at least two disc grabbing members is generally diametrically opposite said at least one other of said at least two disc grabbing members when the disc is positively secured therebetween.

47. A jukebox for playing a disc comprising:
a disc player for playing the disc, said disc player being fixedly secured to a structure;
a disc carrying assembly for at least occasionally engaging and carrying the disc to and from said disc player, said disc carrying assembly being operable to secure the disc onto said disc player in response to a movement of said disc carrying assembly toward said disc player, said disc carrying assembly including at least two disc grabbing members, at least one of said at least two disc grabbing members being movably mounted to said disc carrying assembly, said at least two disc grabbing members being operable to positively secure an edge of the disc therebetween in response to a movement of said disc carrying assembly;
a translating assembly interconnected to said disc carrying assembly, said translating assembly operable to translate said disc carrying assembly to and from said disc player, said disc carrying assembly being slidably mounted on said translating assembly, said at least one of said at least two disc grabbing members being mounted to a clamping arm pivotally mounted to said disc carrying assembly, said clamping arm being pivotable in response to said disc carrying assembly being moved along said translating tower such that said at least one of said at least two disc grabbing members correspondingly moves to engage a first portion of an edge of the disc while at least one other of said at least two disc grabbing members moves with said disc carrying assembly to engage a second portion of the edge of the disc, wherein the disc has a diameter and said at least one of said at least two disc grabbing members is generally diametrically opposite said at least one other of said at least two disc grabbing members when the disc is positively secured therebetween; and
a drive system operable to move said disc carrying assembly toward said disc player for playing the disc and away from said disc player to return the disc to an original storage position, wherein said disc carrying assembly includes a biasing member, said biasing member biasing said clamping arm toward a closed position where said at least one of said at least two disc grabbing members is in a radially inward position to contact said first portion of the edge of the disc.

48. A disc playing apparatus comprising:
a disc rack for holding a plurality of discs;
a disc player for playing a disc selected from said plurality of discs, said disc player being fixedly mounted to a player structure adjacent to one end of said disc rack;

a translating tower movable along a path generally parallel to said disc rack;

a disc holder for rotatably securing the disc to said disc player when the disc is adjacent thereto, said disc holder being movably mounted to said translating tower;

a disc carrier slidably mounted to said translating tower, said disc carrier including first and second disc engaging members, said first disc engaging member being movably mounted on said disc carrier, said second disc engaging member being fixedly secured to said disc carrier; and a drive system operable to move said disc carrier along said translating tower between a first position and a second position and to move said translating tower along said path, said first and second disc engaging members being positioned remotely from an edge of said plurality of discs in said disc rack when said disc carrier is in said first position, said first disc engaging member being movable in response to said disc carrier and said second disc engaging member being moved toward said second position such that said first disc engaging member moves to engage an edge of the disc while said second disc engaging member moves to engage the edge of the disc, said first and second disc engaging members thereby contacting and securing the disc therebetween as said disc carrier is moved by said drive system toward said second position, wherein said disc holder engages the disc at said disc player in response to engagement of said disc holder with a trigger member fixedly interconnected with said player structure.

49. The disc playing apparatus of claim 48, wherein said disc carrier is movable vertically along said translating tower and said translating tower is movable horizontally along said path.

50. The disc playing apparatus of claim 49, wherein said first position is a lowered position and said second position is a raised position.

51. The disc playing apparatus of claim 48, wherein said disc carrier is movable horizontally along said translating tower and said translating tower is movable vertically along said path.

52. The disc playing apparatus of claim 49, wherein said disc rack and said path are curved.

53. The disc playing apparatus of claim 48, wherein said disc holder is pivotally attached to said translating tower such that when said trigger member engages said disc holder, said disc holder pivots to secure the disc on said disc player.

54. The disc playing apparatus of claim 48, wherein said first disc engaging member is mounted to a clamping arm pivotally attached to said disc carrier, said first disc engaging member pivoting about a pivot axis to engage a first portion of the disc while said second disc engaging member moves with said disc carrier to engage a second portion of the disc in response to said disc carrier being moved along said translating tower from said first position toward said second position.

55. The disc playing apparatus of claim 54, wherein said disc carrier includes a biasing member, said biasing member biasing said clamping arm in a closed position where said first disc engaging member is in a radially inward position to contact said first portion of the disc.

56. The disc playing apparatus of claim 55, wherein said translating tower includes an opening member which engages said clamping arm and causes said clamping arm to move to an open position where said first disc engaging member is moved radially outwardly from said first portion of the disc, said clamping arm being moved to said open position when said carrier is moved along said translating tower to said first position, said biasing member moving said clamping arm to said closed position when said opening member disengages said clamping arm as said carrier is moved along said translating tower from said first position toward said second position.

57. The disc playing apparatus of claim 48 further including a third disc engaging member, said third disc engaging member being fixedly secured to said disc carrier, and engageable with the edge of the disc when said disc carrier is moved toward said second position.

58. The disc playing apparatus of claim 48 further including a third disc engaging member, said third disc engaging member being movably mounted to said disc carrier, said third disc carrier being movable relative to said disc carrier to engage the disc in response to said movement of said disc carrier toward said second position.

\* \* \* \* \*

UNITED STATES PATENT AND TRADEMARK OFFICE
CERTIFICATE OF CORRECTION

PATENT NO. : 6,373,796 B1
DATED : April 16, 2002
INVENTOR(S) : Lloyd D. Herring and Peter Chaikowsky It is certified that error appears in the above-identified patent and that said Letters Patent is hereby corrected as shown below:

Column 5,
Line 50, "17a" should be -- 17 --
Line 50, "nd" should be -- and --

Column 19,
Line 44, "49" should be -- 48 --

Signed and Sealed this

Eighth Day of April, 2003

JAMES E. ROGAN
*Director of the United States Patent and Trademark Office*